US007410301B2

(12) United States Patent
Menges et al.

(10) Patent No.: US 7,410,301 B2
(45) Date of Patent: Aug. 12, 2008

(54) LINEAR ROLLING BEARING

(75) Inventors: Martin Menges, Homburg (DE); Thomas Elicker, Ottweiler (DE)

(73) Assignee: Ina-Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/017,621

(22) Filed: Dec. 20, 2004

(65) Prior Publication Data

US 2005/0105834 A1    May 19, 2005

Related U.S. Application Data

(63) Continuation of application No. PCT/EP03/05526, filed on May 27, 2003.

(30) Foreign Application Priority Data

Jun. 21, 2002    (DE)    ................... 102 27 688

(51) Int. Cl.
    *F16C 29/06*    (2006.01)
(52) U.S. Cl. .............. 384/44; 384/43; 384/50
(58) Field of Classification Search ............ 384/43, 384/44, 45
    See application file for complete search history.

(56) References Cited

U.S. PATENT DOCUMENTS

| 4,406,502 | A | * | 9/1983 | Teramachi | ............... | 384/45 |
| 4,417,771 | A | * | 11/1983 | Teramachi | ............... | 384/45 |
| 4,582,369 | A |   | 4/1986 | Itoh |  |  |
| 4,832,510 | A | * | 5/1989 | Sato | ............... | 384/44 |
| 5,102,235 | A | * | 4/1992 | Mugglestone | ............ | 384/45 |
| 5,176,453 | A | * | 1/1993 | Jacob | ............... | 384/43 |
| 5,324,116 | A | * | 6/1994 | Agari | ............... | 384/15 |
| 5,356,223 | A | * | 10/1994 | Agari | ............... | 384/15 |
| 5,358,336 | A | * | 10/1994 | Agari | ............... | 384/15 |
| 6,170,986 | B1 |  | 1/2001 | Hsu et al. |  |  |
| 6,352,366 | B1 |  | 3/2002 | Schneeberger et al. |  |  |
| 2002/0136472 | A1 |  | 9/2002 | Mochizuki et al. |  |  |

FOREIGN PATENT DOCUMENTS

| DE | 36 20 571 | 12/1987 |
| DE | 271 362 | 8/1989 |
| DE | 40 41 269 | 3/1992 |
| DE | 41 39 026 | 6/1992 |
| DE | 296 23 942 | 11/2000 |
| DE | 199 39 747 | 3/2001 |
| EP | 0 449 595 | 10/1991 |
| EP | 0 494 682 | 7/1992 |
| EP | 0 743 465 | 11/1996 |
| JP | 01-1 76811 | 7/1989 |
| JP | 10-0 47344 | 2/1998 |

* cited by examiner

*Primary Examiner*—Richard Ridley
*Assistant Examiner*—Justin Krause
(74) *Attorney, Agent, or Firm*—Charles A. Muserlian

(57) ABSTRACT

This mounting system features a base displaced from a mounting plate which is used to anchor a base mounted receiver releasably. The base has a pair of flexible arms to engage the receiver in channels that have a catch edge at the ends of the channels. The base is constructed with at least one stabilizer element and the receiver has an appropriate alignment slot. Each mounting plate, on both the base and receiver, have a plurality of apertures to facilitate attachment to fabric or a fabric patch or a fabric envelope which thereby allows attachment to different fabric devices together in a releasable yet secure manner. Those devices are to be from the following group, non-exclusive; backpack, jacket, hunting jacket, binocular case, knife case, compass case, first aid case, ammunition pouch, animal call case, web gear, etc.

8 Claims, 5 Drawing Sheets

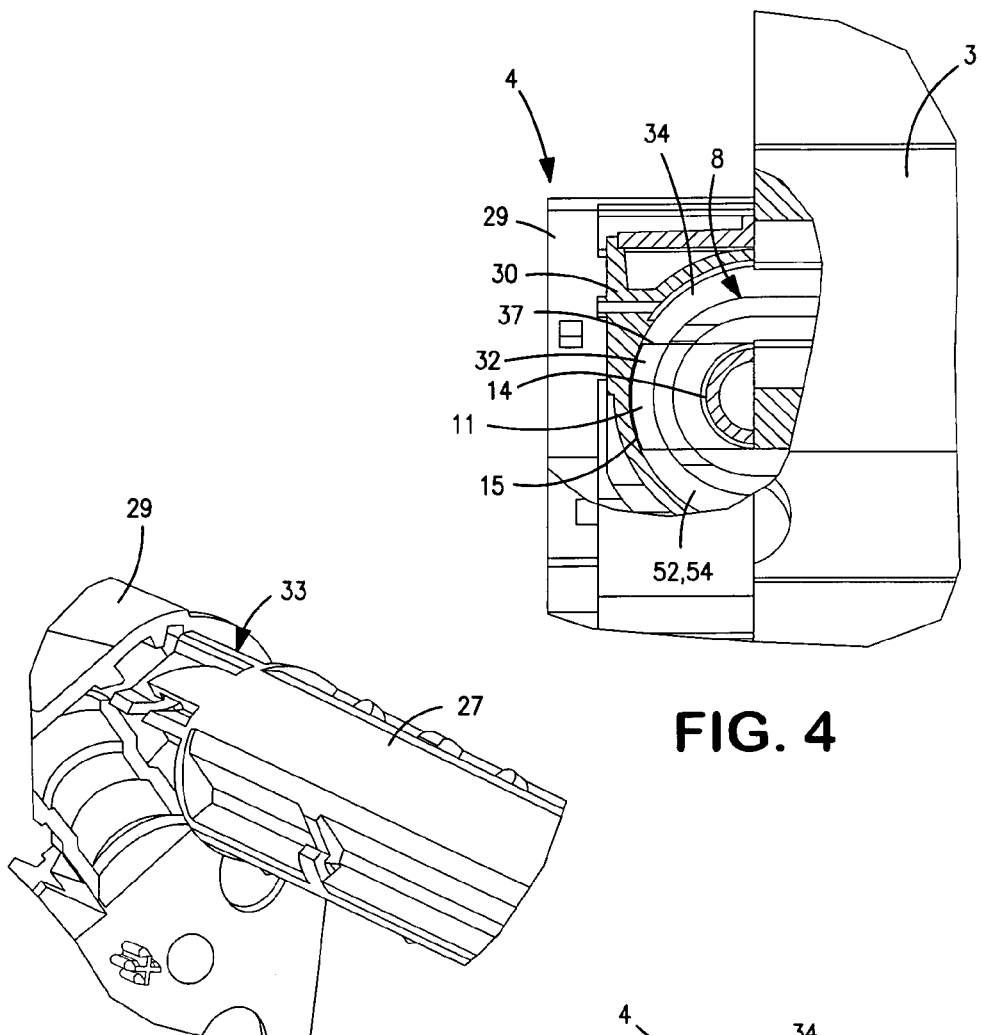
FIG. 4
FIG. 5
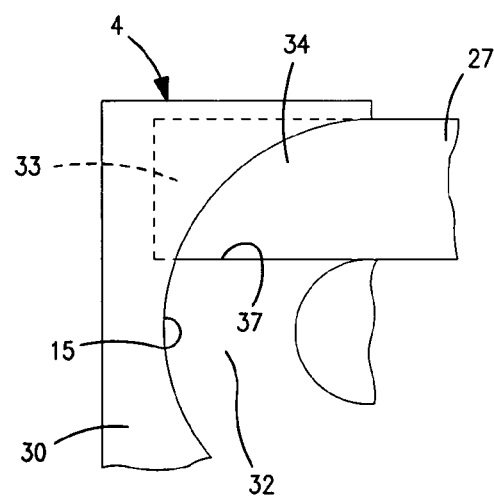
FIG. 6

LINEAR ROLLING BEARING

This application is a Continuation of PCT/EP03/05526 filed May 27, 2003.

FIELD OF THE INVENTION

The present invention concerns a linear rolling bearing as used, for example, in machine tool construction. More particularly, the present invention concerns linear guide units in which such linear rolling bearings are slidably mounted on a guide rail. In linear guide units of the aforesaid type, at least one rolling element circuit is arranged on each long side of the guide rail between the guide carriage of the linear rolling bearing and the guide rail. As viewed in cross-section, four rows of load-bearing rolling elements, for example, can be disposed in face-to-face or back-to-back arrangement. In such arrangements, the guide carriage can also support torques about the longitudinal axis of the guide rail.

DE 41 39 026 A1, for instance, discloses a linear rolling bearing comprising a guide carriage that is mounted through rolling bearing rollers on a guide rail. The guide carriage surrounds the guide rail with two legs in each of which two endless roller channels for the rollers are disposed. Each roller channel comprises a load-bearing channel for load-bearing rollers, a return channel for returning rollers and two deflecting channels that connect the load-bearing channel and the return channel to each other. The guide carriage comprises the return channels and the load-bearing channels. End members arranged on the two front ends of the carrier body comprise the deflecting channels. The carrier body comprises bores in which return tubes are arranged. The return channels for the rollers are formed in these return tubes.

The roller channel comprises raceways for the rollers and side surfaces for laterally delimiting the roller channel. The end members comprise between opposing end-member surfaces a concave outer raceway of the deflecting channel. For a perfect alignment of the return tubes to the end members and to avoid a free rotation of the return tubes in holes of the end members, the return tubes comprise recessed portions and projections on their ends, and the end members comprise a complementary second, profile structure. The return tube composed of two bushing halves comprises a crescent-shaped or segment-shaped projection, while the recessed end faces define a horseshoe-shaped recessed shoulder or section.

The return tubes are inserted into the end members. Due to an unfavorable tolerance situation, an offset can exist within the roller channel at the junction between the return tube and the end member. This means that, for example, rollers coming out of the deflecting channel and rolling into the return channel can tilt on the edge formed by this offset. This edge or offset is particularly crucial on the side surfaces that delimit the roller channel laterally because the rollers can tilt with their front edges on this edge. Because the rollers are unloaded in this region, such a hooking or tilting can easily lead to the rollers getting turned out of their intended position and, in the worst case, getting jammed, so that a smooth circulation of the rollers is no longer possible.

OBJECTS OF THE INVENTION

It is an object of the invention to provide a linear rolling bearing of the pre-cited type in which the danger of tilting or hooking is clearly reduced.

This and other objects and advantages of the invention will become obvious from the following detailed description.

SUMMARY OF THE INVENTION

The invention achieves the above objects by the fact that the return tube comprises tongues that engage into the end member, opposing tongue surfaces of the tongues form, together with opposing end-member surfaces of the end member, side surfaces for laterally delimiting the deflecting channel, and a positioning device assures that the opposing tongue surfaces of the tongues are retained in a common plane with the opposing end-member surfaces of the end member. The invention thus assures that the rollers cannot hook or tilt at their front edges anywhere when they leave the deflecting channel and enter the return channel.

A positioning device that is particularly favorable from the manufacturing point of view comprises: support sections that are arranged on oppositely oriented tongue sides of the tongues, positioning sections that are arranged on opposing tongue sides, stop sections that are disposed on the end member, said positioning sections of the tongues abutting against the stop sections of the end member, and bearing sections that are disposed on the end member, said support sections of the tongues being supported on the bearing sections of the end member. To put it differently, the tongues are arranged between the stop sections and the bearing sections of the end member and are preferably clamped therebetween. Accordingly, the tongues are inserted and positioned between these sections so that the opposing tongue surfaces are arranged in a common plane with the opposing end-member surfaces of the end member.

In a known manner, the end member may comprise side parts on which the end-member surfaces are configured.

The distance between the positioning sections and the opposing tongue surfaces of each tongue, and the distance between the stop sections and the opposing end-member surfaces of the side parts are matched so that the opposing end-member surfaces and the opposing tongue surfaces are situated in a common plane. This means that, to avoid a tilting of the rollers in the transition from the deflecting channel to the return channel, it must only be assured during the manufacturing of the linear rolling bearing of the invention that the two aforesaid distances are exactly respected.

To assure a perfect abutment of the tongues with their positioning sections against the stop sections of the end member, it is particularly advantageous to arrange between the bearing section of the end member and the support sections of the tongues, an elastically or plastically deformable means through whose deformation an abutment of the tongues is achieved.

In a known manner, this means can be configured preferably in the form of squeezable ribs that are plastically deformed when the return tube and the end members are plugged together. This plastic deformation causes the tongues to be pressed against the stop sections. Such squeezable ribs can be formed integrally on the tongues or on the end member. If the end member or the return tube is made with integrally formed tongues out of plastic by injection molding, provision can be made for such squeezable ribs in the mold without any problem.

The squeezable ribs are preferably wedge-shaped. The wedge configuration is such that when the return tube and the end member are plugged together, a keying of the return tube with the end member takes place, so that the positioning sections of the tongues are brought into abutment against the stop sections of the end member.

The invention will now be described more closely with reference to one example of embodiment illustrated in a total of sixteen figures.

BRIEF DESCRIPTION OF THE DRAWINGS

FIG. 4 shows a partial longitudinal section through the linear rolling bearing of FIG. 1, FIG. 5 is a perspective representation of a part of the return tube and a part of the end member of the linear rolling bearing of FIG. 1, FIG. 6 is a simplified representation of the return tube connected to the end member.

FIG. 1 shows a cross-section of a linear guide of the invention comprising a guide carriage 1 that is mounted through rolling bearings on a guide rail 2. The guide carriage 1 comprises a carrier body 3 and end members 4 (see FIG. 4) that are fixed on the two front ends of the carrier body 3. The carrier body 3 comprises two guide legs 5 and a connecting bar 6 that connects these guide legs 5 integrally to each other such that a U-shaped carrier body 3 is formed. The guide carriage 1 is mounted slidably through rollers 7 on the guide rail 2. The rollers 7 are arranged in roller channels 8. Each roller channel 8 comprises a load-bearing channel 9 for load-bearing rollers 7, a return channel 10 for returning rollers 7 and two deflecting channels 11 that connect the load-bearing channel 9 and the return channel 10 to each other. The roller channel 8 comprises raceways 12, 13, 14, 15, 16, 17 for the rollers 7. The raceways 12 are configured on the guide rail 2. Two of these raceways 12 are arranged at an angle of approximately 90° to each other on each long side of the guide rail 2. Corresponding raceways 13 are configured on the two guide legs 5 of he carrier body 3. With such an arrangement of the rollers 7, the guide carriage 1 can transmit forces acting crosswise to the guide rail 2 as well as torques. A concave outer raceway 15 and a convex inner raceway 14 for the rollers 7 are configured in the deflecting channel 11. Raceways 16 and 17 for the rollers 7 are configured on opposing sides of the return channel 10. The roller channel 8 further comprises side surfaces 18, 19, 20, 21, 22, 23, 54 for laterally delimiting the roller channel 8. The side surfaces 18 are configured on opposing sides of the return channel 10. The side surfaces 22, 23, 54 are configured in the deflecting channel 11, and the side surfaces 19, 20, 21 are configured in the load-bearing channel 9.

Figure 1:
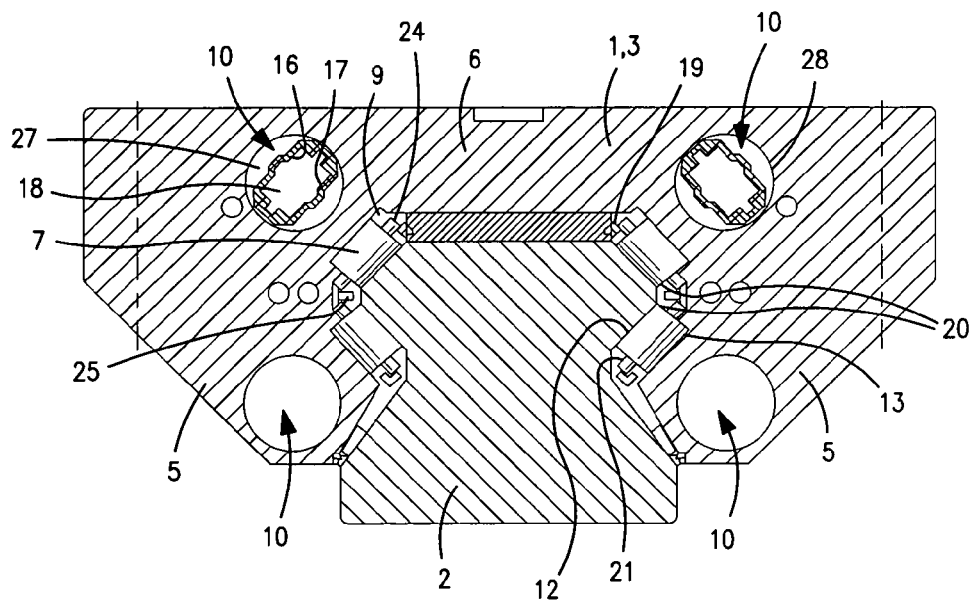
FIG. 1 is a cross-section through a linear rolling bearing of the invention.

Retaining bars 24, 25, 26 are arranged on the two front ends of the rollers 7 in the load-bearing channel 9 and are distinguished in the following as an upper retaining bar 24, a middle retaining bar 25 and a lower retaining bar 26. The side surface 19 is configured on the upper retaining bar 24, the side surface 20 is configured on the middle retaining bar 25 on a side facing the upper retaining bar 24. The side surface 21 is configured on the lower retaining bar 26 and a further side surface is configured on the middle retaining bar 25 on a side facing the lower retaining bar 26. The retaining bars 24, 25, 26 surround the rollers 7 such that the rollers 7 are retained secure against loss on the guide carriage 1. This is particularly advantageous when the guide carriage 1 is removed from the guide rail 2.

The invention further provides a return tube 27 with a substantially smooth outer cylinder surface, a contour being configured within the return tube 27 for forming the return channel 10. The carrier body 3 comprises a total of four through-bores 28 in each of which one return tube 27 is inserted.

The end member 4 (FIG. 4) comprises a head piece 29 that is fixed on the carrier body 3. In the head piece 29 is arranged a deflecting shell 30 whose side parts 31 comprise end-member surfaces 32 on opposing sides, said end-member surfaces 32 constituting the aforesaid side surfaces 22 of the deflecting channel 11. Between the two side parts 31 of a deflecting shell 30 is configured, on the deflecting shell 30, the outer concave raceway 15.

Figure 2:
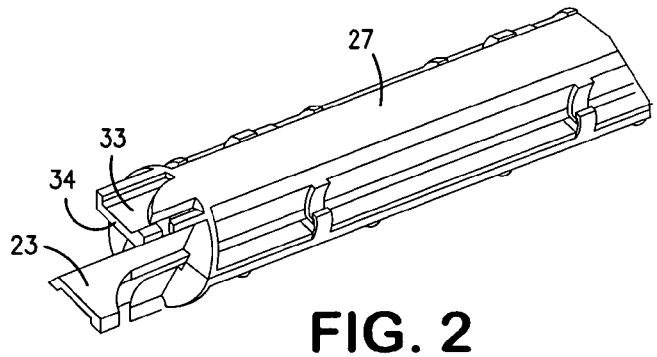
FIG. 2 is a detail showing a return tube of the linear rolling bearing of the invention, in perspective.
Figure 3:
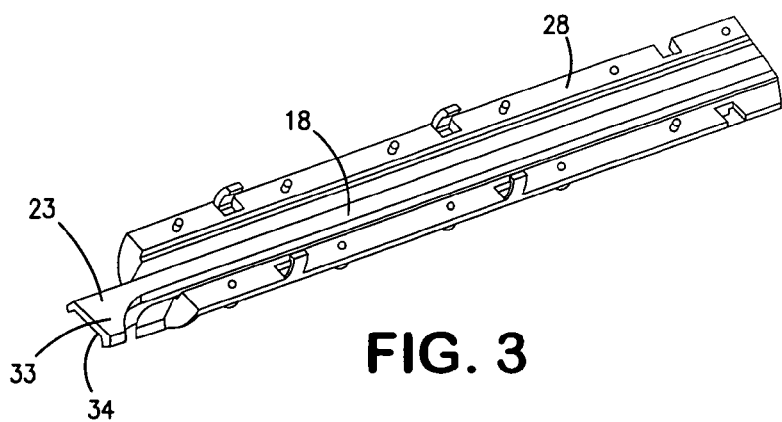
FIG. 3 shows one half of the return tube of FIG. 2.

FIGS. 2 and 3 show the return tube 27 that is composed of two identical longitudinal parts 28. Two tongues 33 are integrally formed on each end of the return tube 27. Opposing tongue surfaces 34 form the aforesaid side surfaces 23 of the deflecting channel 11. This can be clearly seen in FIG. 4. These tongues 33 engage into the end member 4. FIG. 5 shows the return tube 27 and the head piece 29, the return tube 27 being oriented relative to the head piece 29 such that the tongues 33 can be introduced into the head piece 29.

Figure 7:
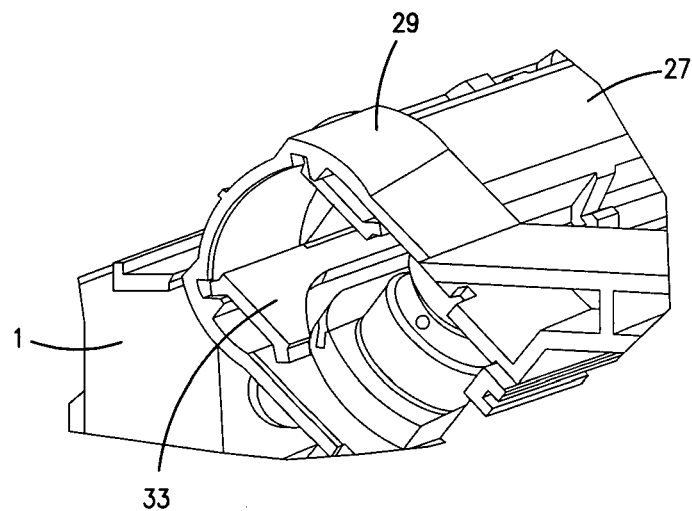
FIG. 7 is a partial perspective representation of the end member and the return tube.

FIG. 7 shows the head piece 29 and the return tube 27 with inserted tongues 33.

Figure 8:
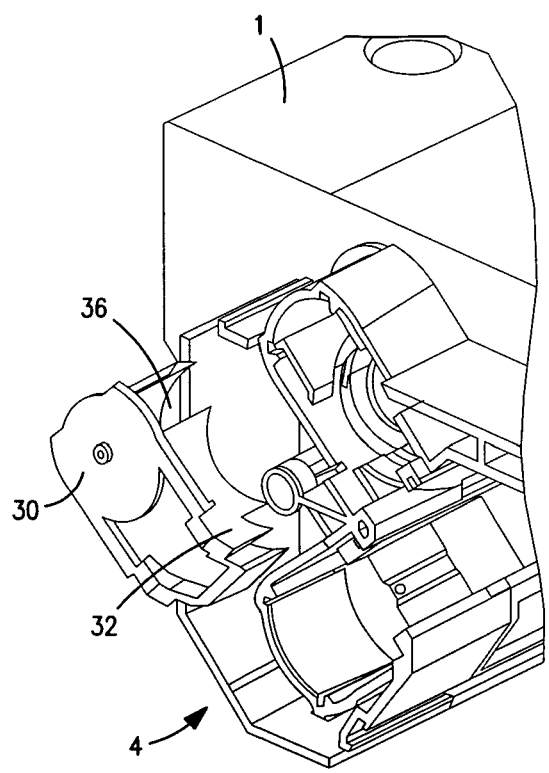
FIG. 8 is a further perspective representation of the end member.

From FIG. 8 it can be seen that the deflecting shell 30 comprises openings 35 that form receptions 36 for the tongues 33 of the return tube 27.

FIG. 6 is a schematic representation of the return tube 27 inserted into the end member 4. Roughly indicated in this figure is the deflecting channel 30 with the concave outer raceway 15, and one of the tongues 33 of the return tube 27 is shown in broken lines. The tongues 33 cross a plane in which the concave outer raceway 15 is arranged. This means that the free ends of the tongues 33 are situated beyond this raceway 15. FIG. 6 further shows that a parting joint 37 is arranged parallel to the return tube 27 between each tongue 33 and the end member 4. In the present example of embodiment, the parting joint 37 is defined by the tongue 33 and the side part 31 of the deflecting shell 30.

The described connection between the return tube 27 and the end member 4 is particularly suitable for large-dimension components. A parting joint between a return tube and an end member in known linear rolling bearings is arranged crosswise to the longitudinal axis of the return tube, so that the parting joint is defined by the free end of the tongue. If due to an unfavorable tolerance situation in such prior art constructions, the length of the tube falls somewhat short of the required length, the parting joint can become so wide that undesired running noises and other disturbances in the circulation of the rolling bearings can be generated. In the linear rolling bearing of the invention, such tolerance variations have no influence on the parting joint because this extends in the longitudinal direction of the return tube 27. In any case, it is assured that the free end of the tongue 33 is situated beyond the deflecting channel 11.

A positioning device 38 is provided for assuring that the opposing tongue surfaces 34 are arranged in a common plane with the opposing end-member surfaces 32 of the end member 4, said opposing tongue surfaces 34 and said opposing end-member surfaces 32 forming the side surfaces 22 and 23 of the deflecting channel 11.

Figure 9:
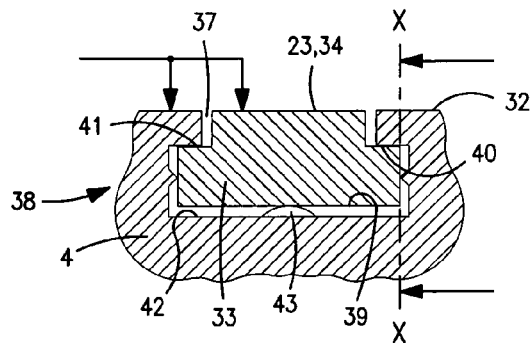
FIG. 9 is a simplified representation of the tongue of the return tube arranged in the end member.
Figure 10:
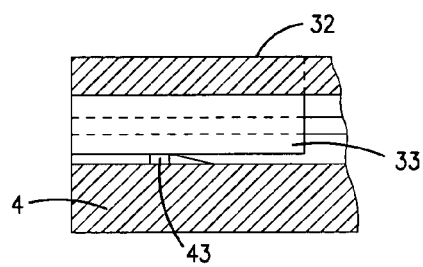
FIG. 10 shows a section along line X-X of FIG. 9.

FIG. 9 shows a possible practical embodiment of a positioning device 38. In this arrangement, the positioning device comprises support sections 39 that are arranged on oppositely oriented tongue sides of the tongues 33, positioning sections 40 that are arranged on opposing tongue sides, stop sections 41 on the end member 4, said positioning sections 40 of the tongues 33 abutting against said stop sections 41 of the end member 4, and bearing sections 42 on the end member 4, said support sections 39 of the tongues 33 being supported on said bearing sections 42 of the end member 4.

In the present case, the support sections 39 are supported indirectly on the bearing section 42 of the end member 4 through a squeezable rib 43 which is integrally formed on the end member 4. The squeezable rib 43 is wedge-shaped so that the tongues 33 when being pushed in get increasingly wedged between the positioning sections 41 of the end member 4 and the squeezable ribs 43.

The distance between the positioning sections 40 of the tongue 33 and the tongue surface 34, and the distance between the stop sections 41 of the end member 4 and the end-member surface 32 of the end member 4 are matched to each other so that the end-member surface 32 and the tongue surface 34 lie in a common plane. This assures that the side surfaces 22 and 23 of the deflecting channel 11 lie in a common plane. The rollers 7 cannot hook or tilt but, much rather, they circulate smoothly in the deflecting channel 11. All that is needed when making the side surfaces 22 and 23 is to respect the aforesaid distances exactly. Tolerance variations at other points of the end member 4 or the return tube 27 have no influence on the position of the tongue surface 34 and the end-member surface 32 relative to each other.

Figure 11:
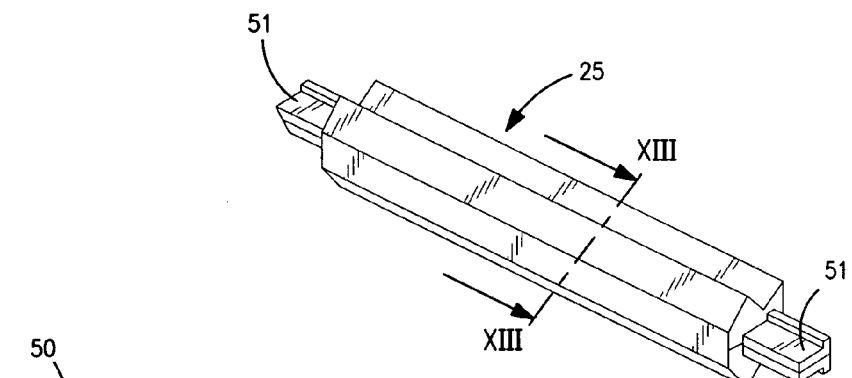
FIG. 11 is a perspective representation of the middle retaining bar as a separate part.
Figure 12:
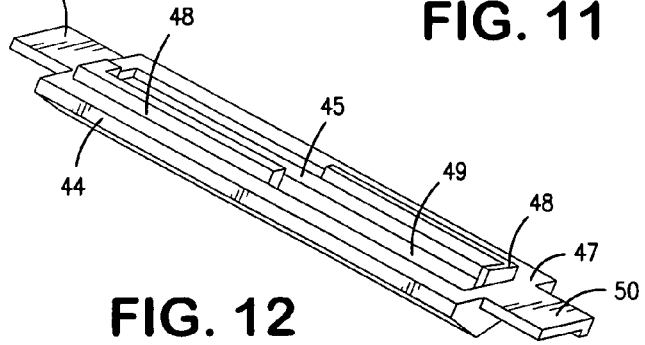
FIG. 12 shows one half of the middle retaining bar in perspective.
Figure 13:
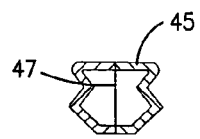
FIG. 13 is a simplified representation of a section through the middle retaining bar along line XIII-XIII of FIG. 11.

FIGS. 11 to 13 show the specially configured middle retaining bar 25. This bar is formed out of two identical longitudinal parts 44. The two-piece configuration is of particular advantage when retaining bars have to be provided for large structures. In such cases, the retaining bars can have a length of 200 mm and more, and a cross-section of 7 mm and more. Such retaining bars are made preferably out of plastic by injection molding. During the cooling process in the injection mold, in the case of one-piece retaining bars, an undesired irregular solidification of the plastic mass can occur that leads to an undesired deformation of the retaining bar. With the two-piece, or even three-piece or four-piece configuration of the retaining bar proposed by the invention, these drawbacks are eliminated because the cross-sections in the mold of the tool can be chosen so that an undesired deformation does not occur. In preferred manner, these two longitudinal parts 44 enclose a hollow space 45 along their entire length, so that the wall thicknesses along their length are substantially constant and are dimensioned in any case such that a perfect cooling without undesired deformation is guaranteed. The hollow space is formed by recesses 46 that are arranged on the longitudinal parts 44 on their opposing parting sides 47. As best seen in FIG. 12, the longitudinal parts 44 comprise webs 48 and, for forming a plug connection 49, the webs 48 of the two longitudinal parts 44 engage into each other to form the retaining bar 25.

If the two longitudinal parts 44 comprise projections and recesses on their opposing parting sides 47, one projection and one recess is arranged on each longitudinal part symmetrically to a transverse center line of the retaining bar 25. With this symmetric arrangement, the two longitudinal parts 44 can be identically configured and inserted into each other without any problem.

Each longitudinal part 44 comprises a partial peg 50 on each of its two ends. When the two longitudinal parts 44 are connected to each other, the partial pegs 50 form a peg 51 at each end. The pegs 51 are inserted into corresponding peg receptions of the end member 4. This configuration of the pegs and the insertion of the pegs into receptions contributes to a perfect connection of the two longitudinal parts of the retaining bar.

Figure 14:
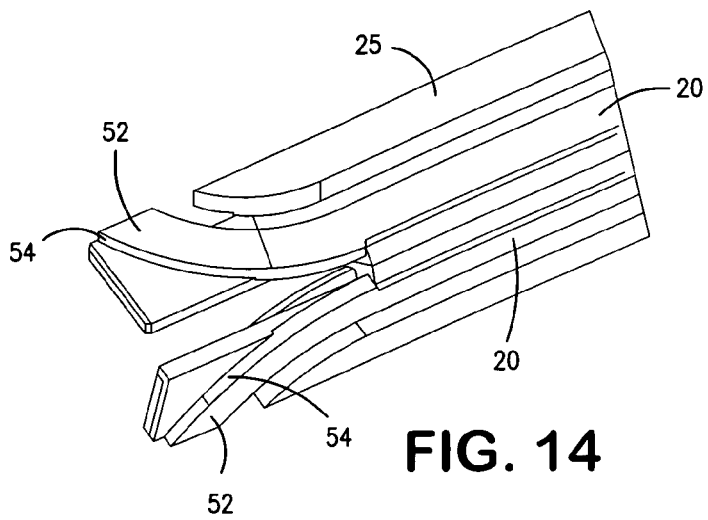
FIG. 14 is a perspective representation of a modified middle retaining bar.

FIG. 14 shows a perspective representation of the middle retaining bar 25. On its ends, the retaining bar 25 comprises tongues 52, and the tongue surface 53 of each tongue 52 forms a side surface 54 of the respective deflecting channel 11. Similar to the tongues 33 of the return tube 27, the tongues 52 cross the plane in which the concave outer raceway 15 of the end member 4 is arranged. This means that the free ends of the tongues 52 are arranged beyond this raceway 15. Here, too, a parting joint 55 between the tongue 52 and the end member 4 is arranged parallel to the retaining bar 25. In the present example of embodiment, the parting joint 55 is defined by the tongue 52 and the side part 31 of the deflecting shell 30. In this case, too, the advantage of the invention that tolerance variations in the length of the retaining bar 25 have no influence on the width of the parting joint 55 is obtained. Accordingly, the rollers 7 can pass smoothly with their front ends through the deflecting channel 11.

To assure that the tongue surfaces 53 are arranged in a common plane with the end-member surfaces 32, said tongue surfaces 53 and said end-member surfaces 32 forming the side surfaces 54 and 22 of the deflecting channel 11, the invention provides a further positioning device 56.

Figure 15:
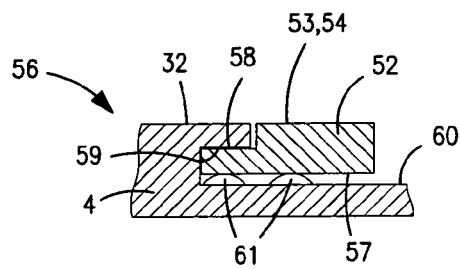
FIG. 15 is a simplified representation of the tongue of the middle retaining bar of FIG. 14 arranged in the end member.
Figure 16:
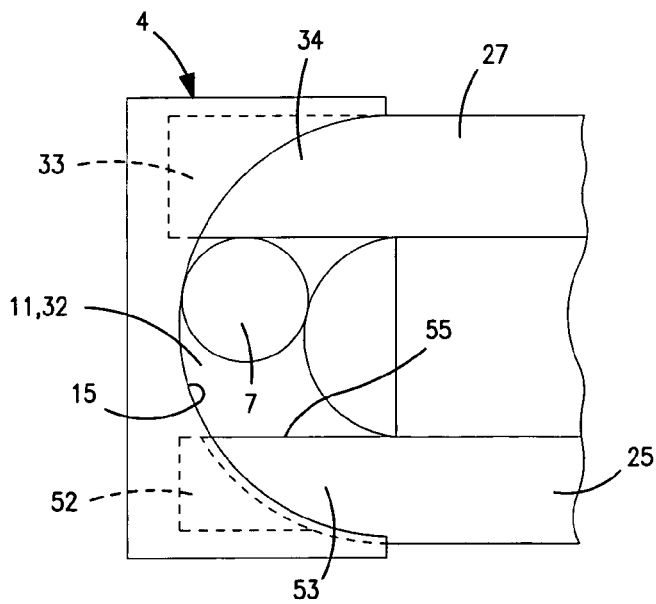
FIG. 16 is a schematic representation of a longitudinal section of the middle retaining bar arranged in the end member.

FIG. 15 shows the arrangement of the tongue 52 of the retaining bar 25 in the end member 4 with the positioning device 56, in a schematic representation. This positioning device 56 comprises a support section 57 that is arranged on the side of the tongue 52 opposite from the tongue surface 53, a positioning section 58 that is arranged on the side of the tongue 52 comprising the tongue surface 53, a stop section 59 on the end member 4, said positioning section 58 of the tongue 52 abutting against the stop section 59 of the end member 4, and a bearing section 60 on the end member 4, said support section 57 of the tongue 52 being supported on the bearing section 60 of the end member 4. In the present example, the support sections 57 are supported indirectly on the bearing section 60 of the end member 4 through squeezable ribs 61 that are formed, in the present example, integrally on the end member 4. The squeezable ribs 61 are wedge-shaped so that the tongues 52 when being pushed in get increasingly wedged between the positioning sections 58 of the end member 4 and the squeezable ribs 61.

The distance between the positioning sections 58 of the tongue 52 and the tongue surface 53, and the distance between the stop sections 59 of the end member 4 and end-member surface 32 of the end member 4 are matched to each other so that the end-member surface 32 and the tongue surface 53 lie in a common plane.

This assures that the side surfaces 22, 23, 54 of the deflecting channel 11 lie in a common plane. The rollers 7 cannot hook or tilt but, much rather, they circulate smoothly in the deflecting channel 11. All that is needed when making the side surfaces 22, 23, 54 is to respect the aforesaid distances exactly. Tolerance variations at other points of the end member 4 or the retaining bar 25 have no influence on the position of the tongue surface 53 and the end-member surface 32 relative to each other.

The invention claimed is:

1. A linear rolling bearing comprising a guide carriage mounted through rolling bearing rollers on a guide rail, said guide carriage comprising
   at least one endless roller channel for the rollers, said roller channel comprising a load-bearing channel for load-bearing rollers, a return channel for returning rollers and two deflecting channels that connect the load-bearing channel and the return channel to each other,
   said guide carriage further comprising a carrier body in which said return channel and said load-bearing channel are arranged, and, on two front ends of the carrier body, end members in which said deflecting channels are arranged,
   said return channel comprising a return tube with a substantially smooth outer cylinder surface, a contour being configured within the return tube for forming the return channel, wherein the return tube is inserted into the carrier body,
   said roller channel comprising raceways for the rollers and side surfaces for laterally delimiting the roller channel,
   each end member comprising between opposing end-member surfaces, a concave outer raceway of one of the deflecting channels, wherein the return tube comprises tongues that engage into the end member,
   opposing tongue surfaces of the tongues form, together with the opposing end-member surfaces of the end member,
   the side surfaces for laterally delimiting the deflecting channel, and a positioning device,
   assures that the opposing tongue surfaces of the tongues are retained in a common plane with the opposing end-member surfaces of the end member, wherein the tongues are clamped between the stop sections and bearing sections of the end member, wherein the stop sections and the bearing sections are arranged one after another in a direction of the roller axis.

2. A linear rolling bearing of claim 1, wherein the stop sections and the bearing sections are arranged on side parts of the end member that comprise the end-member surfaces.

3. A linear rolling bearing of claim 2, wherein a distance between the positioning sections and the opposing tongue surfaces of each tongue, and a distance between the stop sections and the opposing end-member surfaces of the side parts are matched so that the opposing end-member surfaces and the opposing tongue surfaces are situated in a common plane.

4. A linear rolling bearing of claim 1, wherein an elastically or plastically deformable means is arranged between the bearing section of the end member and the support sections of the tongues, and an abutment of the positioning sections of the tongues against the stop sections of the end member is achieved through a deformation of said deformable means.

5. A linear rolling bearing of claim 4, wherein said means is configured in the form of squeezable ribs.

6. A linear rolling bearing of claim 5, wherein the squeezable ribs are formed integrally on the tongues.

7. A linear rolling bearing of claim 5, wherein the squeezable ribs are formed integrally on the end member.

8. A linear rolling bearing of claim 5, wherein the squeezable ribs are wedge-shaped.

* * * * *